3,715,199
METHOD OF KILLING WEEDS IN RICE CROPS UTILIZING BENZYL N,N-DIALKYL-DITHIO-CARBAMATES
Shigeki Wakamori and Yoshio Yoshida, Kanagawa-ken, Sanji Yamauchi, Tokyo, and Yoshio Ishii and Muneharu Goto, Kanagawa-ken, Japan, assignors to Kumiai Chemical Industry Co., Ltd., Tokyo, Japan
No Drawing. Continuation-in-part of application Ser. No. 609,323, Jan. 16, 1967. This application June 6, 1969, Ser. No. 831,247
Int. Cl. A01n 9/12
U.S. Cl. 71—101      4 Claims

ABSTRACT OF THE DISCLOSURE

A method for killing weeds in crops by applying to the soil benzyl N,N-dialkyl dithiocarbamates. The compounds are particularly useful as selective herbicides in aquatic rice crops.

This application is a continuation-in-part of our co-pending application Ser. No. 609,323, filed Jan. 16, 1967, now abandoned.

This invention relates to a method of killing weeds without phytotoxic damage to crop plants in the same soil area, by treating the soil with benzyl N,N-lower alkyl-di-substituted dithiocarbamates.

It has now been found that benzyl N,N-dialkyl-dithiocarbamates of the following formula

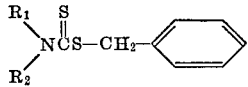

wherein $R_1$ and $R_2$ are identical and are methyl, ethyl, n-propyl, iso-propyl, n-butyl or iso-butyl have a remarkably high herbicidal activity and are very much useful as selective herbicide to narrow-leaved weeds of Gramineae.

Accordingly, we provide a method of killing weeds without phytotoxic damage to crop plants in the same soil area which comprises applying to the soil a herbicidal amount of a benzyl N,N-dialkyl-dithiocarbamate of the following general formula:

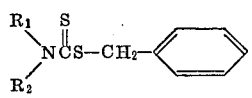

wherein $R_1$ and $R_2$ are identical and are methyl, ethyl, n-propyl, iso-propyl, n-butyl or iso-butyl.

The benzyl N,N-dialkyl-dithiocarbamates of the above-mentioned general formula include the following specific compounds:

benzyl N,N-dimethyl-dithiocarbamate;
benzyl N,N-diethyl-dithiocarbamate;
benzyl N,N-di-n-propyl-dithiocarbamate;
benzyl N,N-di-iso-propyl-dithiocarbamate;
benzyl N,N-di-n-butyl-dithiocarbamate and
benzyl N,N-di-iso-butyl-dithiocarbamate.

All these compounds other than benzyl N,N-dimethyl-dithiocarbamate are novel compounds.

The particular class of compounds which are used in the method of this invention are unique in that they are useful as a selective herbicide for herbicidal treatment of the soil. They are unique in that they can be absorbed primarily at the roots of germinating weeds of Gramineae such as barnyard grass, foxtail, and they have little or no phytotoxicity to crop plants of the same Gramineae such as rice, maize, turf grass and wheat when they are applied to the soil.

Substantially all of the known herbicides for use in the herbicidal treatment of soil which have previously been available are either non-selective general herbicides, or herbicides which exhibit the selective herbicidal activity only between the narrow-leaved plants such as Gramineae and the broad-leaved plants. In contrast to this, the selectively herbicidal compounds used in the method of the present invention have the advantage that they are capable of selectively controlling and removing weeds of Gramineae such as barnyard grass, bristle grass, blue grass, foxtail and finger grass from the fields of crop plants of the same Gramineae such as rice, maize, wheat and turf grass without phytotoxic damage to crop plants.

According to a preferred embodiment of the present invention, therefore, we provides a method of killing weeds of Gramineae in the fields of crop plants of Gramineae without phytotoxic damage to the crop plants, which comprises applying to the soil of the field a herbicidal amount of a benzyl N,N-dialkyl-dithiocarbamate of the following general formula:

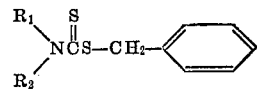

wherein $R_1$ and $R_2$ are identical and are selected from the group consisting of methyl, ethyl, n-propyl, iso-propyl, n-butyl and iso-butyl.

The selectively herbicidal compounds used in the method of the present invention do not prevent the germination or sprouting of seeds or grains of any plant but can be absorbed primarily at the roots and plumule of the weeds of Gramineae, so that the growth of the weeds and elongation of the rootlet thereof can be suppressed, while the growth of the crop plants of the same Gramineae which has been grown to one or more true leave stage are, at most, slightly affected by the herbicidal compounds used in the method of this invention. These selectively herbicidal compounds have further advantageous characteristics as a soil herbicide in that their herbicidal action is *long lasting,* and they do not transfer so far in the depth in the soil when applied onto the surface of soil. When they are applied onto the soil surface, they are strongly absorbed by and within the surface layer of the soil and can exhibit the weed-killing action for a long period. At appropriate concentrations, the selectively herbicidal compounds used in the method of this invention have not a high "contact phytotoxicity" to young plants of crop of Gramineae such as rice, maize and wheat, but it does exhibit a much stronger "contact phytotoxicity" to the predominant weeds of Gramineae such as barnyard grass and foxtail, etc., that the growth of the weeds can be controlled.

Since the herbicidal action of the selectively herbicidal compounds used in the method of this invention is selective between the crop plants of Gramineae and weeds of Gramineae, it has obvious usefulness. Thus, when the selectively herbicidal compounds are applied as a pre-emergence herbicide into the soil in aquatic field of rice plants, they do not produce any damage to the aquatic rice plant but rather exhibit their strong herbicidal action to barnyard grass, a weed of Gramineae, which germinates concurrently with the rice plant. When the present selectively herbicidal compounds are applied onto the surface of soil or even mixed entirely with the soil in the fields of crop plants such as upland rice, maize, wheat and turf grass where the seeds thereof have been sown, they do not exhibit undesirable phytotoxicity to the crop plants, but do control the very harmful weeds such as bristle grass, barnyard grass, foxtail grass, blue grass, and finger grass.

The benzyl N,N-dialkyl-dithiocarbamates may readily be produced in a manner known per se by reacting sodium salt of the correspondingly N-substituted dithiocarbamic acid with a benzyl halide in a reaction medium consisting of a polar solvent such as acetone and alcohols, etc., according to the following equation:

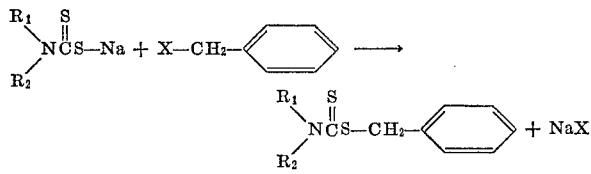

wherein X stands for a halogen atom.

The herbicidal compounds used according to the method of the invention conventionally may be applied in mixture with a solid or liquid diluent which is inert thereto. Thus, the herbicidal compounds may be formulated to a dust by admixing with a solid diluent such as talc, clay, kaolin, silica, calcium carbonate and vermiculite. The herbicidal compounds also may be formulated to wettable powder by admixing with a diluent such as diatomaceous earth, a dispersing agent and a wetting agent. Furthermore, the herbicidal compounds used according to the invention may be mixed with a solid diluent, a surface-active agent and a binder to give granules. The herbicidal compounds also may be dissolved in a solvent to give a solution or may be dispersed in a liquid vehicle such as xylene with aid of an emulsifying agent to give an emulsifiable concentrate. In order to control insect pests, protect the crops against noxious microorganisms and/or save the expense of controlling the pests, it is also possible in the method of the present invention to apply effective amounts of insecticides, miteicides, fungicides, other herbicides, fertilizer and plant-growth regulators etc. to the soil simultaneously.

The present invention is now illustrated with reference to the following examples. However, the invention is not limited to these examples.

EXAMPLE 1

5 parts by weight of benzyl N,N-dimethyl-dithiocarbamate were mixed with 95 parts by weight of talc and the mixture was ground thoroughly in a mill to give a dust.

EXAMPLE 2

20 parts by weight of benzyl N,N-diethyl-dithiocarbamate were mixed with 5 parts by weight of a dispersing agent, that is sodium salt of Formalin beta-naphthalene sulfonate and 5 parts by weight of kaolin. The resulting mixture was ground thoroughly in a mill to give a wettable powder.

EXAMPLE 3

30 parts by weight of benzyl N,N-di-isopropyldithiocarbamate were dispersed into 50 parts of xylene containing 20 parts of "New Kalgen" (a trade name of an emulsifying agent consisting of a mixture of at least 45% of polyoxyethylene alkylaryl sulfonate and white carbon). An emulsifiable concentrate was obtained.

EXAMPLE 4

2 parts of benzyl N,N-di-n-butyl-dithiocarbamate were mixed with 87 parts of talc, 10 parts of sodium salt of Formalin beta-naphthalene sulfonate (dispersing agent) and 1 part of sodium lignin sulfonate (binder), and the mixture was formed into granules.

EXAMPLE 5

In this example, the tests were carried out to determine the germination-inhibiting activity of the benzyl N,N-dialkyl-dithiocarbamates which may be used as the herbicidal compounds according to the invention.

The procedure of test was as follows: a diluvial volcanic ash was placed in a petri dish of a diameter of 9 cm. to a depth of 1 cm. A compound to be tested was formulated to an emulsifiable concentrate containing 30% of the active ingredient in the same way as in Example 3, and then the emulsifiable concentrate was diluted with water to an active ingredient concentration of 500 p.p.m. The resulting emulsion was applied in a quantity of 15 ml. to the soil in the dish and the soil was then agitated thoroughly. Seeds of radish (*Raphanus sativus*) and barnyard grass (*Tanicum crusgalli* L. var. *Frumentacum trin*) were subsequently sowed into the upper layer of the soil and cultivated. 10 days after the sowing, degree of inhibition to root growth of the plants was determined according to Raphanus Test C method. Degree of inhibition to root growth was then calculated by the following equation:

$$\text{Degree of inhibition to root growth in percent} = 100 \times \left(1 - \frac{\text{Length of root of plant in the plot treated with the active compound}}{\text{Length of root of plant in the plot untreated}}\right)$$

The results obtained are tabulated in Table 1 as mentioned hereinafter.

EXAMPLE 6

In this example, the tests were performed to determine the phytotoxicity of the benzyl N,N-dialkyl-dithiocarbamates which are present in contact with leaf and haulm of plants. The phytotoxicity in this meaning is hereinafter referred to as "contact phytotoxicity."

The procedure of test was as follows: a compound to be tested was formulated to an emulsifiable concentrate containing 30% of the active ingredient in the same way as in Example 3, and the concentrate was diluted with water to an active ingredient concentration of 1%. The resulting emulsion was then sprayed uniformly onto one-leaf-aged radish plant, two-leaf-aged foxtail water plant (*Alopecurus geniculatus* L.) and two-leaf-aged wheat plant which were cultivated in pots of a diameter of 10 cm., respectively. The quantity of the diluted emulsion sprayed was 1 ml. per pot. 7 days after the application of the active compound, the herbicidal activity was estimated according to the following ratings:

0 = No damage
1 = Little damage
2 = Small damage
3 = Medium damage
4 = Severe damage
5 = Complete kill The results of test obtained are tabulated in Table 1 below.

TABLE 1

| Name of compound tested | Germination-inhibiting activity (degree of inhibition to root growth in percent) | | Contact phytotoxicity | | |
|---|---|---|---|---|---|
| | Radish | Barnyard grass | Radish | Wheat | Foxtail |
| Benzyl N,N-dimethyl dithiocarbamate | 25 | 65 | 0 | 5 | 5 |
| Benzyl N,N-diethyl dithiocarbamate | 47 | 87 | 1 | 5 | 2 |
| Benzyl N,N-di-isopropyl-dithiocarbomate | 45 | 80 | 3 | 5 | 4 |

The following compounds listed in Table 2 below were tested.

TABLE 2

| | Abbreviation |
|---|---|
| Benzyl N,N-di-iso-propyl-dithiocarbamate | Compound A |
| Benzyl N,N-di-n-propyl-dithiocarbamate | Compound B |
| Benzyl N,N-di-iso-butyl-dithiocarbamate | Compound C |
| Benzyl N,N-di-n-butyl-dithiocarbamate | Compound D |
| Benzyl N,N-dimethyl-dithiocarbamate | Compound E |
| Benzyl N,N-diethyl-dithiocarbamate | Compound F |

Advantageous properties of these benzyl N,N-dialkyldithiocarbamates suitable for use in the herbicidal treatment of soil are now demonstrated by various tests in the following examples.

EXAMPLE 7

In this example, the tests were carried out to determine the phytotoxicity of the benzyl N,N-dialkyl-dithiocarbamate when applied to and absorbed at the roots of plants.

Five plants of aquatic rice (of a kind of "Norin No. 18") and five plants of wild barnyard grass (*Echinochloa crusgalli* L. Beauv) were cultivated in a pot, respectively. Roots of the plants of 3- to 4-leaf age in the pot were immersed in a test solution containing an active compound at different concentrations as indicated in Table 3. Temperature of the test solution was maintained at 30° C. during the test. 8 days after the immersion, the general condition of the over-ground portion of the plants was estimated by visual observation, and the number and length of the roots were measured. Degree of suppression of the number of developed roots (D.S.N.R) in percent was then calculated according to the following equation:

Degree of suppression of the number of developed roots in percent $$= 100 \times \left(1 - \frac{\text{Number of developed roots of plants in the plot treated}}{\text{Number of developed roots of plants in the plot untreated}}\right)$$

Degree of overall inhibition to root growth (D.O.I.R.G.) in percent was also calculated according to the following equation:

D.O.I.R.G. in percent $$= 100 \times \left(1 - \frac{\text{Total of lengths of roots of plants in the plot treated}}{\text{Total of lengths of roots of plants in the plot untreated}}\right)$$

The condition of the over-ground portion of the plants was estimated by the following ratings:

- − = No damage
- + = Minor damage
- ++ = Medium damage
- +++ = Severe damage
- ++++ = Extreme damage The tests were effected in two replications, and the results of test are tabulated as the average value in Table 3 below.

TABLE 3

| Compound | Concentration in p.p.m. | D.S.N.R. in percent of— | | D.O.I.R.G. in percent of— | | Condition of over-ground portion | |
|---|---|---|---|---|---|---|---|
| | | Rice | Barnyard grass | Rice | Barnyard grass | Rice | Barnyard grass |
| A | 100 | 40 | 100 | 13 | 100 | ++ | ++++ |
|   | 10  | 29 | 76  | 0  | 90  | −  | +++  |
|   | 1   | 0  | 37  | 0  | 43  | −  | +    |
| B | 100 | 46 | 100 | 20 | 100 | ++ | ++++ |
|   | 10  | 28 | 57  | 0  | 72  | −  | ++   |
|   | 1   | 0  | 10  | 0  | 31  | −  | +    |
| C | 100 | 30 | 100 | 17 | 100 | +  | ++++ |
|   | 10  | 14 | 69  | 0  | 76  | −  | ++   |
|   | 1   | 0  | 16  | 0  | 34  | −  | +    |
| D | 100 | 24 | 100 | 10 | 100 | ++ | ++++ |
|   | 10  | 0  | 80  | 0  | 85  | −  | +++  |
|   | 1   | 0  | 3   | 0  | 54  | −  | +    |
| E | 100 | 4  | 100 | 8  | 100 | +  | ++++ |
|   | 10  | 0  | 72  | 0  | 89  | −  | +++  |
|   | 1   | 0  | 46  | 0  | 68  | −  | +    |
| F | 100 | 42 | 100 | 22 | 100 | +  | ++++ |
|   | 10  | 16 | 66  | 0  | 85  | −  | +++  |
|   | 1   | 0  | 33  | 0  | 70  | −  | +    |

Both the aquatic rice plant and the barnyard grass belong to the same family Gramineae. When the effects of Compounds A, B, C, D, E and F on the development of roots and on the condition of the overground portion of these plants of which roots have been immersed in the test solution containing said active compound were examined, it may be seen that all of these tested active compounds are selectively herbicidal to the barnyard grass as the damage to barnyard grass is very much more pronounced than the damage to aquatic rice plant.

EXAMPLE 8

In this example, the tests were made to determine the degree of transfer of the benzyl N,N-dialkyl-dithiocarbamates in soil when rain fell.

The procedure of test was as folows: an alluvial soil was placed in a bottomless pot in a form of ring with measuring scale and then compacted under a slight pressure. A compound to be tested was applied uniformly onto the upper surface of the soil at a rate of 50 grams per are, and 24 hours later an artificial rain of 20 mm. was made to fall thereon. After the system was allowed to leave for 48 hours, the soil was divided into six sections, that is, a section of down to a depth of 1 cm., a section of a depth of 1 cm. to 2 cm., a section of a depth of 2 cm. to 3 cm., a section of a depth of 3 cm. to 4 cm., a section of a depth of 4 cm. to 5 cm. and a section of a depth of 5 cm. to 6 cm. The soil in each of these sections was placed into a dish of a diameter of 9 cm., and then sowed with seeds of barnyard grass and radish, respectively. Thereafter, the degree of inhibition to root the upper section of depth of 2 to 3 cm. in the soil substantially without being entrained away by a descending stream of water such as rain.

EXAMPLE 9

In this example, the tests were made to examine a degradative inactivation of the benzyl N,N-dialkyl-dithiocarbamates present in soil.

The procedure of test was as follows: a test liquor containing an active compound in a concentration of 100 p.p.m. was prepared and then absorbed into a given amount of an alluvial soil down to a depth of 3 cm. The soil was kept under scattered light. Precaution was taken to maintain the treated soil in a very much moisty state but such that the soil could not flow away and be lost. Several portions of the soil were removed therefrom as sample at intervals of a few days. Seeds of radish and barnyard grass were then sowed in the sample soil and the degree of inhibition to root growth was determined

TABLE 5

| | Degree of inhibition to root growth in percent of Compound— | | | | | | | | | | | |
|---|---|---|---|---|---|---|---|---|---|---|---|---|
| | A | | B | | C | | D | | E | | F | |
| Days after absorption into soil | Barnyard grass | Radish | Barnyard grass | Radish | Barnyard grass | Radish | Barnyard grass | Radish | Barnyard grass | Radish | Barnyard grass | Radish |
| 1 | 92 | 100 | 91 | 100 | 89 | 100 | 94 | 100 | 92 | 100 | 92 | 100 |
| 3 | 90 | 100 | 90 | 100 | 86 | 100 | 89 | 100 | 90 | 100 | 90 | 100 |
| 5 | 90 | 97 | 88 | 95 | 80 | 95 | 85 | 90 | 81 | 87 | 87 | 90 |
| 7 | 85 | 90 | 80 | 91 | 78 | 87 | 80 | 83 | 74 | 85 | 86 | 85 |
| 9 | 70 | 85 | 80 | 87 | 73 | 85 | 75 | 76 | 70 | 80 | 80 | 84 |
| 11 | 60 | 82 | 72 | 80 | 70 | 80 | 72 | 70 | 70 | 74 | 75 | 76 |
| 13 | 45 | 71 | 53 | 76 | 56 | 77 | 50 | 58 | 65 | 70 | 64 | 70 |
| 15 | 40 | 70 | 48 | 73 | 51 | 70 | 42 | 52 | 63 | 66 | 60 | 63 |
| 17 | 30 | 62 | 27 | 54 | 25 | 53 | 20 | 32 | 59 | 60 | 58 | 58 |
| 19 | 20 | 43 | 25 | 48 | 21 | 40 | 18 | 21 | 56 | 54 | 51 | 48 |
| 21 | 20 | 40 | 16 | 32 | 20 | 23 | 16 | 16 | 15 | 20 | 23 | 25 |
| 26 | 15 | 28 | 13 | 5 | 0 | 14 | 0 | 0 | 0 | 0 | 0 | 0 |
| 31 | 5 | 10 | 0 | 0 | 0 | 0 | 0 | 0 | 0 | 0 | 0 | 0 | growth was determined in the same manner as in Example 5. The results of test obtained are tabulated in Table 4 below.

TABLE 4

| Compound | Soil section depth in cm. | Degree of inhibition to root growth of — | |
|---|---|---|---|
| | | Radish | Barnyard grass |
| A | (1) | 21 | 82 |
| | 1-2 | 13 | 39 |
| | 2-3 | 0 | 0 |
| | 3-4 | 0 | 0 |
| | 4-5 | 0 | 0 |
| | 5-6 | 0 | 0 |
| B | (1) | 24 | 56 |
| | 1-2 | 14 | 44 |
| | 2-3 | 10 | 32 |
| | 3-4 | 0 | 0 |
| | 4-5 | 0 | 0 |
| | 5-6 | 0 | 0 |
| C | (1) | 26 | 44 |
| | 1-2 | 24 | 8 |
| | 2-3 | 0 | 0 |
| | 3-4 | 0 | 0 |
| | 4-5 | 0 | 0 |
| | 5-6 | 0 | 0 |
| D | (1) | 21 | 47 |
| | 1-2 | 0 | 0 |
| | 2-3 | 0 | 0 |
| | 3-4 | 0 | 0 |
| | 4-5 | 0 | 0 |
| | 5-6 | 0 | 0 |
| E | (1) | 57 | 70 |
| | 1-2 | 18 | 46 |
| | 2-3 | 0 | 21 |
| | 3-4 | 0 | 0 |
| | 4-5 | 0 | 0 |
| | 5-6 | 0 | 0 |
| F | (1) | 57 | 82 |
| | 1-2 | 21 | 44 |
| | 2-3 | 7 | 39 |
| | 3-4 | 0 | 0 |
| | 4-5 | 0 | 0 |
| | 5-6 | 0 | 0 |

[1] Down to 1.

From the results as shown in Table 4, it is clear that all the tested active compounds when applied onto the soil surface can remain in a high concentration within in the same manner as in Example 5 according to Raphanus Test C method. Mediate measurement was also made by determining other damage of the plants.

The results obtained are tabulated in Table 5 above.

The results of Table 5 show that all the active compounds tested can sustain their germination-inhibiting activity for a period of at least 14 to 21 days after they are applied into the soil.

EXAMPLE 10

In this example, the tests were carried out to examine the effect of the concentrations of the benzyl N,N-dialkyl-dithiocarbamates on their "contact phytotoxicity."

The procedure of test was as follows: a test liquor containing an active compound at different concentrations as indicated in Table 6 below was sprayed in a quantity of 5 c.c. by means of a micro-sprayer onto 2- to 3-leaf-aged aquatic rice plants, 2- to 3-leaf-aged barnyard grass plants and cotyledon-sprouting radish plants which were cultivated in a pot of an area of 1/10,000 are, respectively. 5 days after the application of the active compound, the general condition of the over-ground portion of the plants was visually observed and estimated according to the following ratings:

− = No damage
± = Slight damage
+ = Minor damage
+ + = Medium damage

The results of test obtained are tabulated in Table 6 below.

TABLE 6

| Compound | Concentration of active compound applied— | | | | | | | | |
|---|---|---|---|---|---|---|---|---|---|
| | Aquatic rice, p.p.m. | | | Barnyard grass, p.p.m. | | | Radish, p.p.m. | | |
| | 5,000 | 1,000 | 500 | 5,000 | 1,000 | 500 | 5,000 | 1,000 | 500 |
| A | ± | − | − | ++ | ± | − | ± | − | − |
| B | ± | − | − | ++ | ± | − | ± | − | − |
| C | ± | − | − | ++ | ± | − | ± | − | − |
| D | ± | − | − | ++ | ± | − | ± | − | − |
| E | ± | − | − | ++ | ± | − | ± | − | − |
| F | ± | − | − | ++ | ± | − | ± | − | − |

The results obtained show that all the active compounds tested are less likely to affect adversely the plants even in a relatively high concentration of up to 5,000 p.p.m. when they are applied directly onto the leaves and haulm of the plants.

EXAMPLE 1

In this example, the tests were carried out to determine the weed-killing action and phytotoxicity to crop plants of the benzyl N,N-dialkyl-dithiocarbamates when applied to soil shortly after the sowing of seed of the crop plants.

The procedure of test was as follows: a test field was divided into several plots each of which had an area of 1 m.². Seeds of upland rice, soybean, maize and cucumber were sowed in the plots, respectively. Next day, the plots were treated with an active compound by applying to the soil at different rates as indicated in Table 7 hereinafter. 25 days after the treatment, the phytotoxical damage to the crop plants was estimated by visual observation, and the number and weight of weeds sprouted were measured in the treated plots and in the untreated plots. Percentages of the number and weight of weeds in the treated plots were then calculated, respectively, as compared to those of weeds sprouted in the untreated plots. The results obtained are tabulated in Table 7 below.

From the results as shown in Table 7, it appears that all the active compounds tested do not affect adversely the germination of seed of crop plants such as upland rice, soybean, maize and cucumber but can control the growth of weeds when they are applied to the soil before the germination of crop seeds and weed seeds takes place.

EXAMPLE 12

In this example, the tests were carried out to determine the herbicidal activity of the benzyl N,N-dialkyl-dithiocarbamates in the condition of paddy rice field after transplantation of aquatic rice plants.

The procedure of test was as follows: a test paddy field was divided into plots each of which has an area of 7.5 m.². The paddy field contained an alluvial soil in which the rate of descent of the flooding water was 2 cm. per day. Aquatic rice plants of 4- to 5-leaf-age and of a kind "Ginmasari" were transplanted in the plots and then flooded with water. 3 days or 10 days after the transplantation, the plots were treated with an active compound applied in different rates as indicated in Table 8 below. 25 days after the treatment, the phytotoxical damage to the rice plants was estimated by visual observation, and the number and weight of weeds sprouted in the treated plot and in the untreated plot were measured. Percentages of

TABLE 7

| Compound | Rate of application of active compound in grams/10 area | Phytotoxical damage to crop plant | | | | Weed-killing action | |
|---|---|---|---|---|---|---|---|
| | | Upland rice | Soybean | Maize | Cucumber | Percent of weed number | Percent of weed weight |
| A | 1,000 | No | No | No | Little | 43 | 21 |
| | 500 | No | No | No | No | 45 | 23 |
| | 250 | No | No | No | No | 47 | 27 |
| B | 1,000 | No | No | No | Little | 39 | 31 |
| | 500 | No | No | No | No | 42 | 35 |
| | 250 | No | No | No | No | 64 | 58 |
| C | 1,000 | No | No | No | Little | 15 | 9 |
| | 500 | No | No | No | No | 23 | 22 |
| | 250 | No | No | No | No | 31 | 30 |
| D | 1,000 | No | No | No | Little | 7.2 | 8 |
| | 500 | No | No | No | No | 8.4 | 9.2 |
| | 250 | No | No | No | No | 33 | 26 |
| E | 1,000 | No | No | No | Little | 0 | 0 |
| | 500 | No | No | No | No | 11 | 14 |
| | 250 | No | No | No | No | 23 | 20 |
| F | 1,000 | No | No | No | Little | 15 | 12 |
| | 500 | No | No | No | No | 42 | 31 |
| | 250 | No | No | No | No | 46 | 33 | the number and weight of weeds in the treated plot were then calculated as compared to those in the untreated plot, respectively.

The results obtained are shown in Table 8 below.

TABLE 8

| Compound | Rate of application of active compound in grams/ 10 area | Percent of weed number | | Percent of weed weight | | Phytotoxical damage to aquatic rice |
|---|---|---|---|---|---|---|
| | | 3 days after treatment | 10 days after treatment | 3 days after treatment | 10 days after treatment | |
| A | 250 | 24 | 38 | 23.4 | 42.6 | No. |
| | 500 | 13 | 19 | 9.0 | 14.3 | No. |
| | 1,000 | 7 | 8 | 0.1 | 4.0 | No. |
| B | 250 | 32 | 37 | 42.4 | 39.0 | No. |
| | 500 | 16 | 16 | 9.6 | 12.0 | No. |
| | 1,000 | 12 | 13 | 7.8 | 7.0 | No. |
| C | 250 | 9 | 23 | 4.2 | 34.0 | No. |
| | 500 | 6 | 14 | 0.6 | 9.8 | No. |
| | 1,000 | 0 | 4 | 0 | 6.0 | No. |
| D | 250 | 9 | 32 | 18.2 | 41.0 | No. |
| | 500 | 16 | 18 | 14.2 | 21.0 | No. |
| | 1,000 | 10 | 10 | 3.9 | 7.0 | No. |
| E | 250 | 78 | 63 | 53.4 | 48.0 | No. |
| | 500 | 56 | 58 | 42.4 | 40.0 | No. |
| | 1,000 | 16 | 13 | 7.2 | 14.0 | No. |
| F | 250 | 58 | 59 | 35.2 | 43.0 | No. |
| | 500 | 36 | 43 | 27.0 | 38.0 | No. |
| | 1,000 | 12 | 20 | 4.2 | 23.0 | No. |

From the results as mentioned in Table 8, it is clear that all the tested active compounds when applied into the water of irrigating aquatic rice plants at rates of 250 to 1000 grams/10 area are very much highly effective in controlling the weeds but substantially have not action of inhibiting the growth of aquatic rice plants.

What is claimed is:

1. A method of killing weeds in a water-flooded paddy field of aquatic rice plant without phytotoxic damage to the rice plant in the same soil area, which comprises applying to the soil of the paddy field a herbicidal amount of a benzyl N,N-dialkyl-dithiocarbamate of the following general formula:

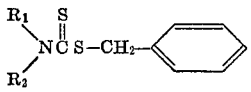

wherein $R_1$ and $R_2$ are identical and are ethyl, n-propyl, iso-propyl, n-butyl or iso-butyl.

2. The method of killing undesirable weeds of Gramineae in water-flooded paddy field of aquatic rice plant without phytotoxic damage to the rice plant, which comprises applying to the soil of the rice paddy field a herbicidal amount of a benzyl N,N-dialkyl-dithio-carbamate of the following general formula:

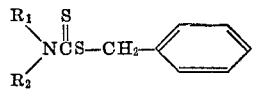

wherein $R_1$ and $R_2$ are identical and are ethyl, n-propyl, isopropyl, n-butyl or iso-butyl.

3. A method as claimed in claim 1 in which a herbicidal amount of benzyl N,N-di-ethyl-dithiocarbamate is applied to the soil.

4. A method as claimed in claim 1 in which a herbicidal amount of benzyl N,N-di-isopropyl-dithiocarbamate is applied to the soil.

References Cited

UNITED STATES PATENTS 2,992,091  7/1961  Harman et al. _____ 71—100
2,941,879  6/1960  Goodhue _____ 71—100

LEWIS GOTTS, Primary Examiner

C. L. MILLS, Assistant Examiner